(12) United States Patent
Kidokoro et al.

(10) Patent No.: US 7,957,164 B2
(45) Date of Patent: Jun. 7, 2011

(54) POWER DEVICE FOR SUPPLYING AC VOLTAGE TO A LOAD HAVING A DISCHARGE PART

(75) Inventors: Hitoshi Kidokoro, Tokyo (JP); Masato Matsubara, Tokyo (JP); Akihiko Iwata, Tokyo (JP); Hiroyasu Iwabuki, Tokyo (JP); Akihiro Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 684 days.

(21) Appl. No.: 11/587,302

(22) PCT Filed: Apr. 21, 2004

(86) PCT No.: PCT/JP2004/005699
§ 371 (c)(1),
(2), (4) Date: May 7, 2007

(87) PCT Pub. No.: WO2005/104343
PCT Pub. Date: Nov. 3, 2005

(65) Prior Publication Data
US 2007/0223256 A1    Sep. 27, 2007

(51) Int. Cl.
*H02M 5/40*    (2006.01)
(52) U.S. Cl. .......................................................... 363/34
(58) Field of Classification Search .................. 363/17, 363/21.02, 34, 159; 321/9; 219/10.55
See application file for complete search history.

(56) References Cited

U.S. PATENT DOCUMENTS

| | | | |
|---|---|---|---|
| 3,800,210 A * | 3/1974 | Caussin ........................... | 363/40 |
| 4,002,875 A * | 1/1977 | Kiuchi et al. .................. | 219/601 |
| 4,876,635 A | 10/1989 | Park et al. | |
| 4,901,214 A * | 2/1990 | Hiramatsu et al. .............. | 363/19 |
| 5,302,858 A * | 4/1994 | Folts ............................... | 307/66 |
| 5,504,668 A * | 4/1996 | Beyerlein et al. ............... | 363/95 |
| 5,568,368 A * | 10/1996 | Steigerwald et al. ........... | 363/17 |

(Continued)

FOREIGN PATENT DOCUMENTS
EP    0379580 A1    8/1990
(Continued)

OTHER PUBLICATIONS

Communication from the European Patent Office dated Sep. 16, 2009 for counterpart European Application 04728632.3-2207.

*Primary Examiner* — Adolf Berhane
*Assistant Examiner* — Yemane Mehari
(74) *Attorney, Agent, or Firm* — Sughrue Mion, PLLC (57) ABSTRACT

The present invention provides a power device including a converter part (2) for converting an AC voltage to a DC voltage; an inverter part (3) for converting the DC voltage outputted from the converter part (2) to the AC voltage; and a transformer (4) having an inductance forming a series resonance circuit together with an electrostatic capacity of a load (20) to boost the AC voltage outputted from the inverter part (3). In the power device, an inductance (7) is connected to the output part of the inverter part (3) in parallel with the transformer (4). Thus, in a discharge part 6 provided in the load (20), since when a discharge is not generated, a recovery current is not supplied to a circulating current diode in the inverter part (3), or the quantity of the recovery current is reduced, the heat generation of the circulating current diode can be suppressed without increasing the number of elements of the circulating current diode.

12 Claims, 10 Drawing Sheets

U.S. PATENT DOCUMENTS

| | | | | |
|---|---|---|---|---|
| 5,910,712 A * | 6/1999 | Toyama | | 315/307 |
| 6,028,778 A * | 2/2000 | Amano | | 363/40 |
| 6,038,149 A * | 3/2000 | Hiraoka et al. | | 363/37 |
| 6,307,757 B1 * | 10/2001 | Porter et al. | | 363/21.01 |
| 6,462,964 B2 * | 10/2002 | Porter et al. | | 363/21.01 |
| 6,504,732 B2 * | 1/2003 | Abe | | 363/17 |
| 6,519,168 B2 * | 2/2003 | Jain et al. | | 363/98 |
| 6,583,992 B2 * | 6/2003 | Porter et al. | | 363/21.01 |
| 6,661,205 B1 * | 12/2003 | Muraki et al. | | 320/166 |
| 6,694,438 B1 * | 2/2004 | Porter et al. | | 713/300 |
| 7,315,464 B2 * | 1/2008 | Sawada et al. | | 363/159 |
| 7,408,268 B1 * | 8/2008 | Nocentini et al. | | 307/16 |
| 2005/0030767 A1 * | 2/2005 | Phadke et al. | | 363/17 |
| 2005/0180175 A1 * | 8/2005 | Torrey et al. | | 363/17 |
| 2006/0077695 A1 * | 4/2006 | Garcea et al. | | 363/17 |
| 2007/0070656 A1 * | 3/2007 | Mino | | 363/17 |
| 2007/0081364 A1 * | 4/2007 | Andreycak | | 363/17 |
| 2008/0037290 A1 * | 2/2008 | Suzuki et al. | | 363/17 |

FOREIGN PATENT DOCUMENTS

| | | |
|---|---|---|
| JP | 2-151776 A | 6/1990 |
| JP | 4-299074 A | 10/1992 |
| JP | 5-328159 A | 12/1993 |
| JP | 9-129953 A | 5/1997 |
| JP | 2003-143874 A | 5/2003 |

* cited by examiner

POWER DEVICE FOR SUPPLYING AC VOLTAGE TO A LOAD HAVING A DISCHARGE PART

TECHNICAL FIELD

The present invention relates to a technique of a power device that supplies AC voltage to a load having a discharge part to generate a discharge.

BACKGROUND ART

Figure 7:
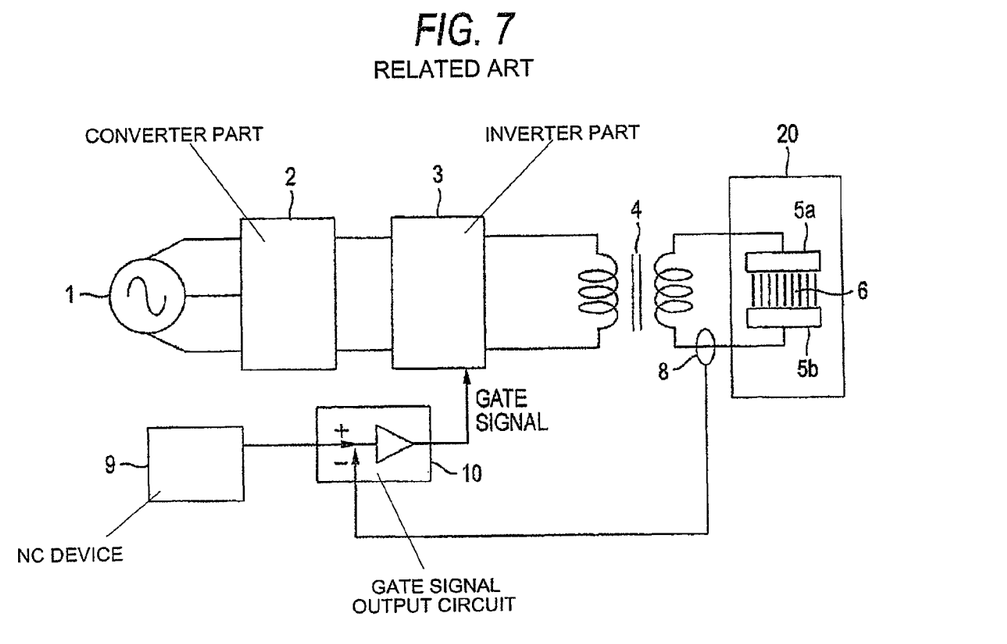
FIG. 7 is a basic block diagram of a usual power device for a gas laser oscillator.

FIG. 7 shows the configuration of a usual power device for a gas laser oscillator disclosed in JP-A-9-129953. The AC voltage of a commercial power source 1 is converted to a DC voltage in a converter part 2 and inputted to an inverter part 3. In the inverter part 3, switching elements are turned on and off by a gate signal of a gate signal output circuit 10 and the DC voltage is converted to a square wave AC voltage. The output voltage of the inverter part 3 is boosted by a high frequency transformer 4 having an inductance L and applied to a part between dielectric electrodes 5a and 5b having an electrostatic capacity C, so that a discharge 6 is generated. A discharge current supplied between the dielectric electrodes 5a and 5b has its quantity set by a command value outputted from an NC device 9. The gate signal output circuit 10 outputs the gate signal to the inverter part 3 under a discharge frequency fso $(>1/2\pi\sqrt{(LC)})$ by a PWM control on the basis of the output value of a discharge current detecting circuit 8 for detecting the discharge current and the command value of the NC device 9.

Figure 3:
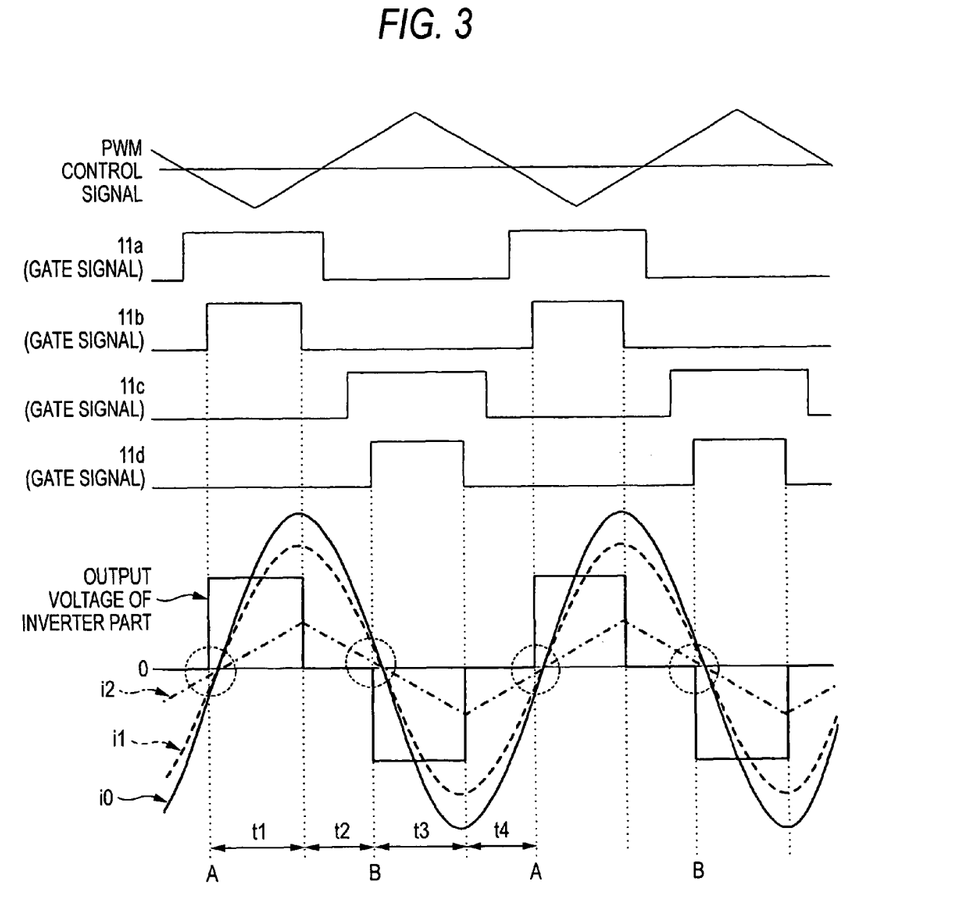
FIG. 3 shows wave forms of an output voltage and current during discharge on period of the load of the inverter part in the power device according to the first embodiment of the present invention.
Figure 8:
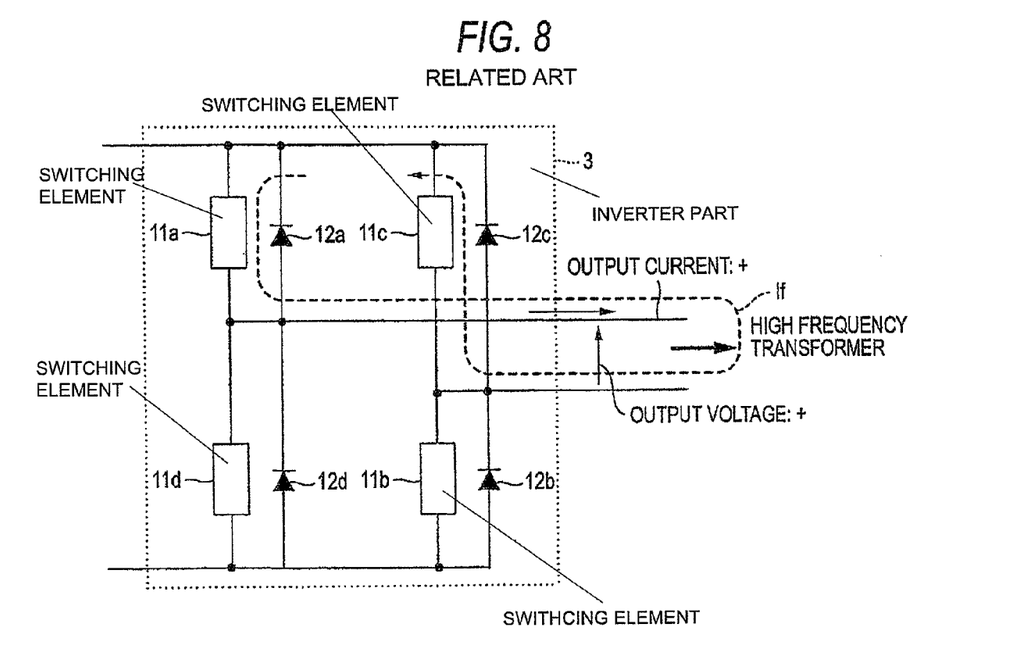
FIG. 8 is a basic block diagram of an inverter part of the usual power device for the gas laser oscillator.
Figure 9:
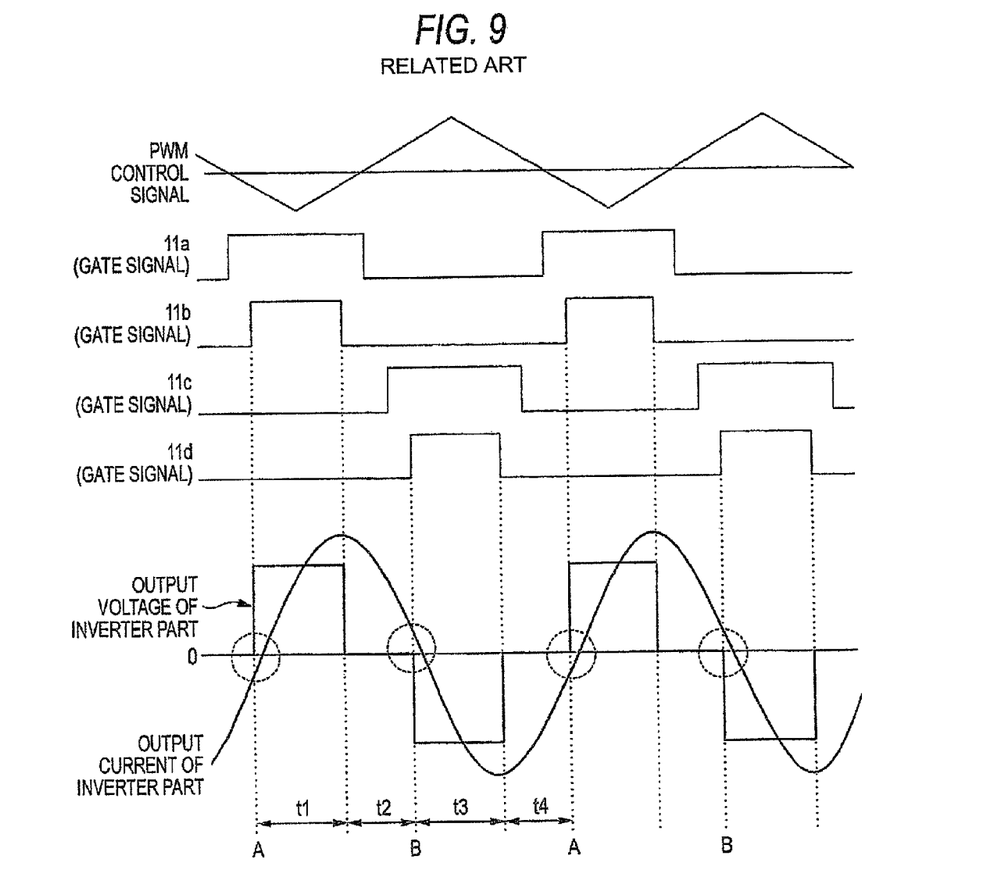
FIG. 9 shows waveforms of an output voltage and current during discharge on period of the inverter part in the usual power device for the gas laser oscillator.

The operation of the inverter part 3 carried out when the discharge 6 is generated (refer it to as during discharge on period, hereinafter) is described below. FIG. 8 shows the configuration of the inverter part 3 in the related art. The inverter part 3 includes switching elements 11a, 11b, 11c and 11d and circulating current diodes 12a, 12b, 12c and 12d connected in parallel with them. FIG. 9 shows examples of the wave forms of an output voltage and a current of the inverter part 3 when the inverter part 3 is controlled in accordance with the PWM system. The plus of the wave form of the voltage and the wave form of the current in FIG. 9 indicate that in the wave form of the voltage, an arrow mark of the output voltage is directed toward a plus (a high potential) side in FIG. 8 and, in the wave form of the current, the output current flows in the direction of an arrow mark in FIG. 8. At this time, to highly efficiently reduce the switching loss of the elements forming the inverter part 3, the inverter part 3 ordinarily operates under the frequency fso $(>1/2\pi\sqrt{(LC)})$ slightly higher than a series resonance frequency fr $(=1/2\pi\sqrt{(LC)})$ determined by the inductance L of the high frequency transformer 4 and the electrostatic capacity C of the dielectric electrodes 5a and 5b. As shown in FIG. 9, the output current of the inverter part 3 has a phase lag relative to the output voltage of the inverter part. When the switching element 11b is turned off from a state that the switching elements 11a and 11b are turned on (during t1 shown in FIG. 9), a circulating current If shown by a broken line in FIG. 8 is supplied to the circulating current diode 12c in the direction of the plus (during t2 shown in FIG. 9). Under this state, the switching element 11c is turned on, and then, the switching element 11d is turned on. When the switching element 11d is turned on, that is, at a point B in FIG. 9, a backward voltage is applied to the circulating current diode 12a, however, in the point B, since the circulating current If flows in the direction of the plus, a forward current is not supplied to the circulating current diode 12a. Accordingly, in the circulating current diode 12a, a recovery current is not generated.

Similarly, when the switching element 11d is turned off from a state that the switching elements 11c and 11d are turned on (during t3 shown in FIG. 9), a circulating current If' is supplied to the circulating current diode 12a in the direction opposite to that of the circulating current If shown by the broken line in FIG. 8, that is, in the direction of the minus (during t4 as shown in FIG. 9). Under this state, the switching element 11a is turned on, and then, the switching element 11b is turned on. When the switching element 11b is turned on, that is, at a point A shown in FIG. 9, a backward voltage is applied to the circulating current diode 12c, however, at the point A, the circulating current If' flows in the minus direction, a forward current is not supplied to the circulating current diode 12c. Accordingly, a recovery current is not generated in the circulating current diode 12c.

As described above, in the related art, the output current ordinarily has the phase lag relative to the output voltage, so that when the discharge is generated, the recovery current is adapted not to be generated in the circulating current diode.

Figure 10:
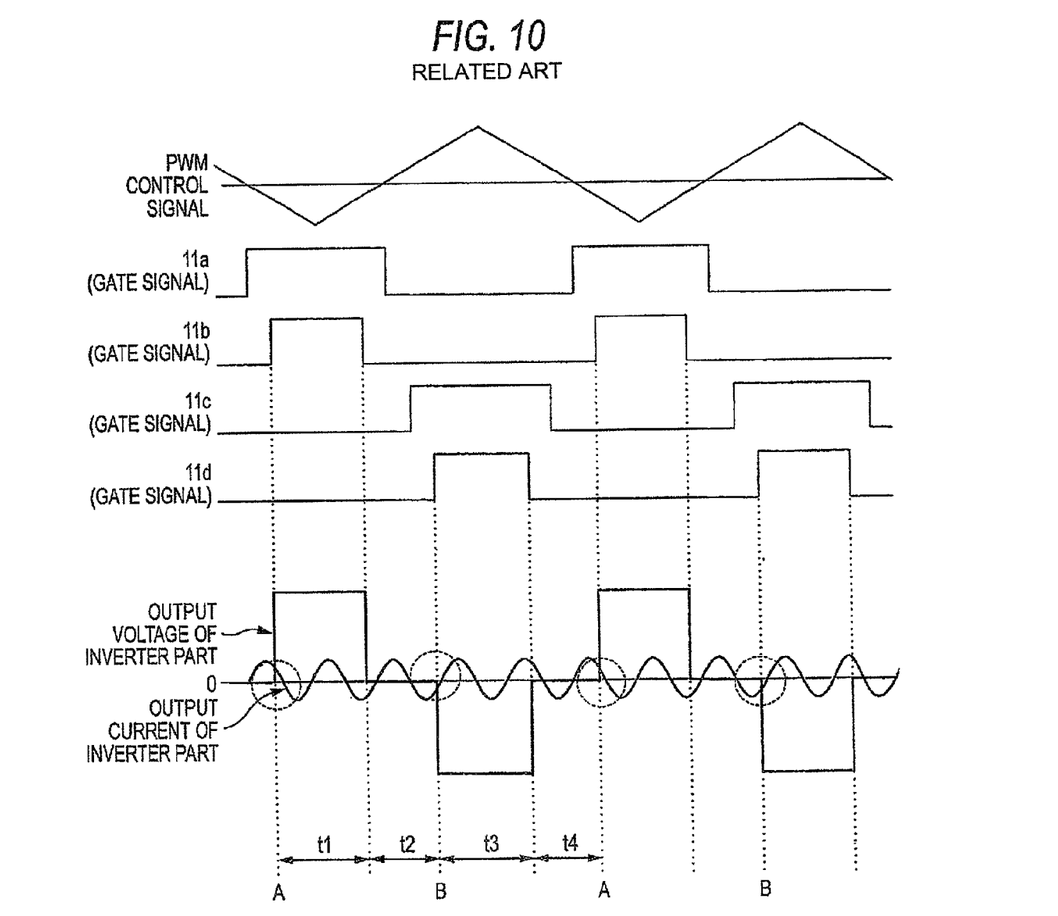
FIG. 10 shows waveforms of an output voltage and current during discharge off period of the inverter part in the usual power device for the gas laser oscillator.

However, when the discharge 6 is not generated (refer it to as during discharge off period, hereinafter), the discharge current is not continuously supplied until the discharge is generated by applying the voltage to the dielectric electrodes, though the voltage is applied. The wave forms of the output voltage and the current of the inverter part 3 in this case are, for instance, shown in FIG. 10. The plus of the voltage wave form and the current wave form shown in FIG. 10 indicates that in the wave form of the voltage, an arrow mark of the output voltage is directed toward a plus (a high potential) side in FIG. 8, and in the wave form of the current, the output current flows in the direction of an arrow mark in FIG. 8. As shown in FIG. 10, the output current of the inverter part 3 during discharge off period has a wave form asynchronous with the wave form of the output voltage. This phenomenon arises because of a reason why when the discharge is generated between the dielectric electrodes 5a and 5b, a gap between the dielectric electrodes 5a and 5b serves as a DC resistance component, however, when the discharge is not generated, the gap serves as a capacitance, the circuit is equivalent to a circuit in which the capacitance is inserted in series to the dielectric electrodes 5a and 5b. Thus, since the impedance and the resonance frequency of the circuit change, a dark current having a peak or a frequency determined by them flows. As described above, since the circuit is equivalent to the circuit in which the capacitance is inserted in series to the dielectric electrodes 5a and 5b, the electrostatic capacity of the entire part of the discharge part is ordinarily decreased and the resonance frequency rises.

As shown in FIG. 10, when the dark current flows, at a point A when the switching element 11b in FIG. 10 is turned on, the switching element 11b is turned on and the backward voltage is applied to the circulating current diode 12c. However, at the point A, the dark current is supplied in the direction of the plus, namely, from the switching element 11a to the high frequency transformer and to the circulating current diode 12c. Since the forward current is supplied to the circulating current diode 12c, the recovery current is supplied to the circulating current diode 12c. Accordingly, an abnormal heat generation arises in the circulating current diode 12c.

Similarly, at a point B when the switching element 11d in FIG. 10 is turned on, the switching element 11d is turned on and the backward voltage is applied to the circulating current diode 12a. However, at the point B, the dark current is supplied in the direction of the minus, that is, from the switching element 11c to the high frequency transformer and to the circulating current diode 12a. Since the forward current is supplied to the circulating current diode 12a, the recovery current is supplied to the circulating current diode 12a. Thus, an abnormal heat generation arises in the circulating current diode 12a.

As described above, in the power device for the gas laser oscillator having a load discontinuous between during discharge on period and during discharge off period, to meet the above-described problem generated during discharge off period according to the related art, the number of the circulating current diodes connected in parallel can be merely increased to distribute the loss of the circulating current diode due to the recovery current. Meanwhile, in recent years, a discharge frequency in the power device for the gas laser oscillator becomes progressively high and the response speed of an employed circulating current diode is requested to be high. Thus, the loss due to the recovery current is also increased. Accordingly, many relatively expensive and high speed diodes need to be used in parallel, which results in a very serious problem in view of the rise of a cost and the increase of a mounting space.

DISCLOSURE OF THE INVENTION

It is an object of the present invention to prevent a circulating current diode of an inverter part from entering a recovery mode or reduce the entering operation of the circulating current diode to the recovery mode in all operating state in a power device having a load discontinuous between during discharge on period and during discharge off period so that the heat generation of the circulating current diode by the recovery current can be reduced and to provide a more compact and inexpensive power device.

A power device according to the present invention includes a converter part for converting a commercial AC voltage to a DC voltage by a rectifying element; an inverter part for converting the DC voltage outputted from the converter part to an AC voltage of high frequency; and a high frequency transformer having an inductance forming a series resonance circuit with an electrostatic capacity of dielectric electrodes of a load to boost the high frequency AC voltage outputted from the inverter part to a high voltage. In the power device, an inductance is connected to the output part of the inverter part in parallel with the high frequency transformer.

The power device according to the present invention includes a converter part for converting a commercial AC voltage to a DC voltage by a rectifying element; an inverter part for converting the DC voltage outputted from the converter part to an AC voltage of high frequency; and a high frequency transformer having an inductance forming a series resonance circuit with an electrostatic capacity of dielectric electrodes of a load to boost the high frequency AC voltage outputted from the inverter part to a high voltage, and an inductance is connected to the output part of the inverter part in parallel with the high frequency transformer. Accordingly, since when a discharge in the load is not generated, a recovery current is not supplied to a circulating current diode in the inverter part, or the quantity of the recovery current is reduced, the heat generation of the diode can be suppressed without increasing the number of elements of the circulating current diode, and the miniaturization and the low cost of the power device can be effectively realized.

BEST MODE FOR CARRYING OUT THE INVENTION

First Embodiment

Figure 1:
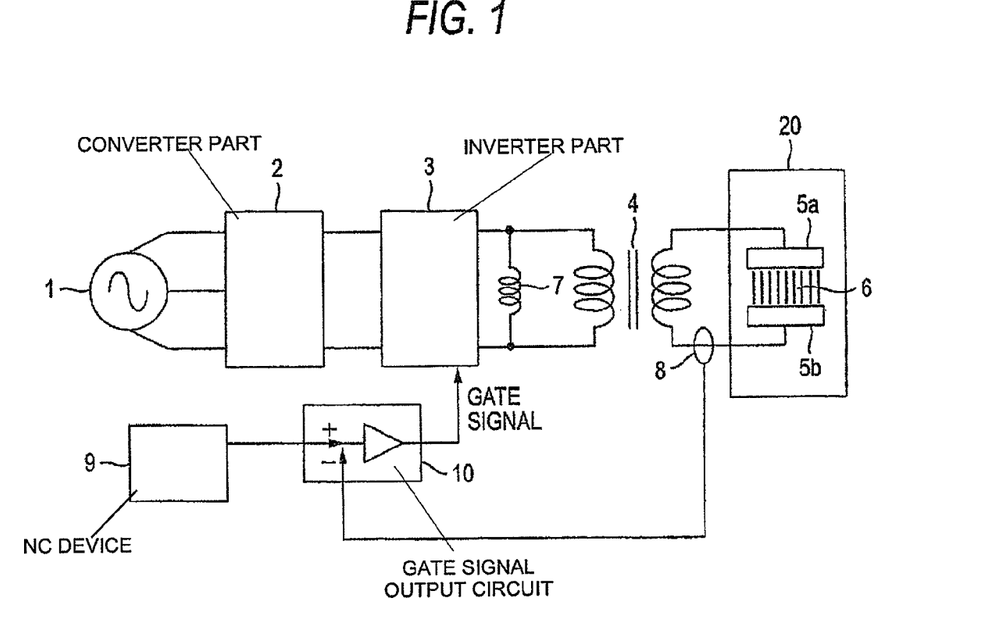
FIG. 1 is a basic block diagram of a power device according to a first embodiment of the present invention.

FIG. 1 is block diagram showing a power device according to a first embodiment for carrying out the present invention. The power device is connected to a gas laser oscillator having dielectric electrodes as a load to generate a discharge between the dielectric electrodes.

In FIG. 1, an AC voltage in a commercial power source 1 is converted to a DC voltage in a converter part 2 and the DC voltage is inputted to an inverter part 3. In the inverter part 3 including a switching element and a circulating current diode connected in parallel with the switching element, the switching element is turned on and off in accordance with a gate a signal of a gate signal output circuit 10 and the DC voltage is converted to a square wave AC voltage. An output voltage of the inverter part 3 is boosted by a high frequency transformer 4 having an inductance L and outputted from the power device. An electric power of the high frequency and high voltage outputted from the power device is applied to, for instance, a part between dielectric electrodes 5a and 5b having an electrostatic capacity C of the gas laser oscillator connected to the power device as the load. Thus, a discharge 6 is generated between the dielectric electrodes 5a and 5b to oscillate a laser. The inductance L of the high frequency transformer 4 and the electrostatic capacity C of the dielectric electrodes 5a and 5b of the laser oscillator as the load form a series resonance circuit. To the output side of the inverter part 3, a parallel inductance 7 is connected in parallel with the high frequency transformer 4. Further, a discharge current supplied between the dielectric electrodes 5a and 5b has its quantity set by a command value outputted from an NC device 9. The gate signal output circuit 10 outputs the gate signal to the inverter part 3 from an output value of a discharge current detecting circuit 8 for detecting the discharge current and the command value of the NC device 9 under a discharge frequency fso ($>1/2\pi\sqrt{LC}$)) by a PWM control. Since the inverter part 3 shown in FIG. 1 has the same configuration as that of the circuit shown in FIG. 8, this embodiment is described by using the reference numerals shown in FIG. 8.

Figure 2:
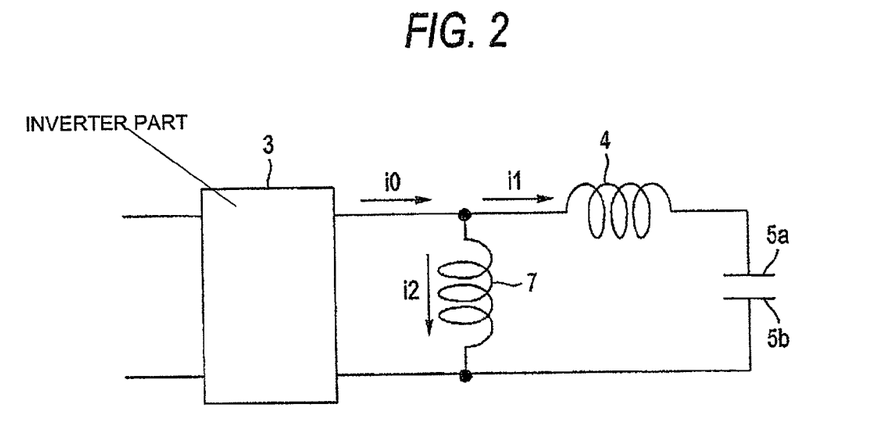
FIG. 2 is a diagram showing an equivalent circuit of a load side of an inverter part of the power device according to the first embodiment of the present invention.

Now, an operation of this embodiment will be described below. FIG. 2 shows an equivalent circuit of a load side of the inverter part 3 in the power device according to the first embodiment. Further, FIG. 3 shows waveforms of an output voltage and current of the inverter part 3 during discharge on period. The plus marks of the voltage wave forms and the current wave forms in FIG. 3 mean that the direction of the arrow mark of the output voltage in FIG. 8 is directed to a plus (a high potential) side and the output current flows in the direction the arrow mark. A broken line i1 in FIG. 3 shows the wave form of a current supplied to the high frequency transformer 4 side as shown in FIG. 2. This wave form is equivalent to the wave form of the output current of the usual power device without parallel inductance 7 shown in FIG. 9. A dashed line i2 in FIG. 3 shows a wave form of a current supplied to the parallel inductance 7 side as shown in FIG. 2. Since the load is a simple inductive load, the output current has a phase lag relative to the output voltage as shown in FIG. 3. A full line i0 shown in FIG. 3 shows the wave form of the output current of the inverter part 3 as shown in FIG. 2 and is expressed by i0=i1+i2. Therefore, the output current i0 shows the wave form increased more by the current i2 supplied to the parallel inductance 7 than the wave forms (FIG. 9) of the output voltage and current of the inverter part 3 during discharge on period in the related art. As shown in FIG. 3, at a point A when a switching element 11b is turned on, a circulating current flows in the direction of a minus. At a point B when a switching element 11d is turned on, a state that the circulating current flows in the plus direction is maintained. Thus, the operation of the inverter part 3 is the same as the usual operation during discharge on period. Accordingly, a recovery current is not generated in circulating current diodes 12a and 12b in the inverter part 3.

Figure 4:
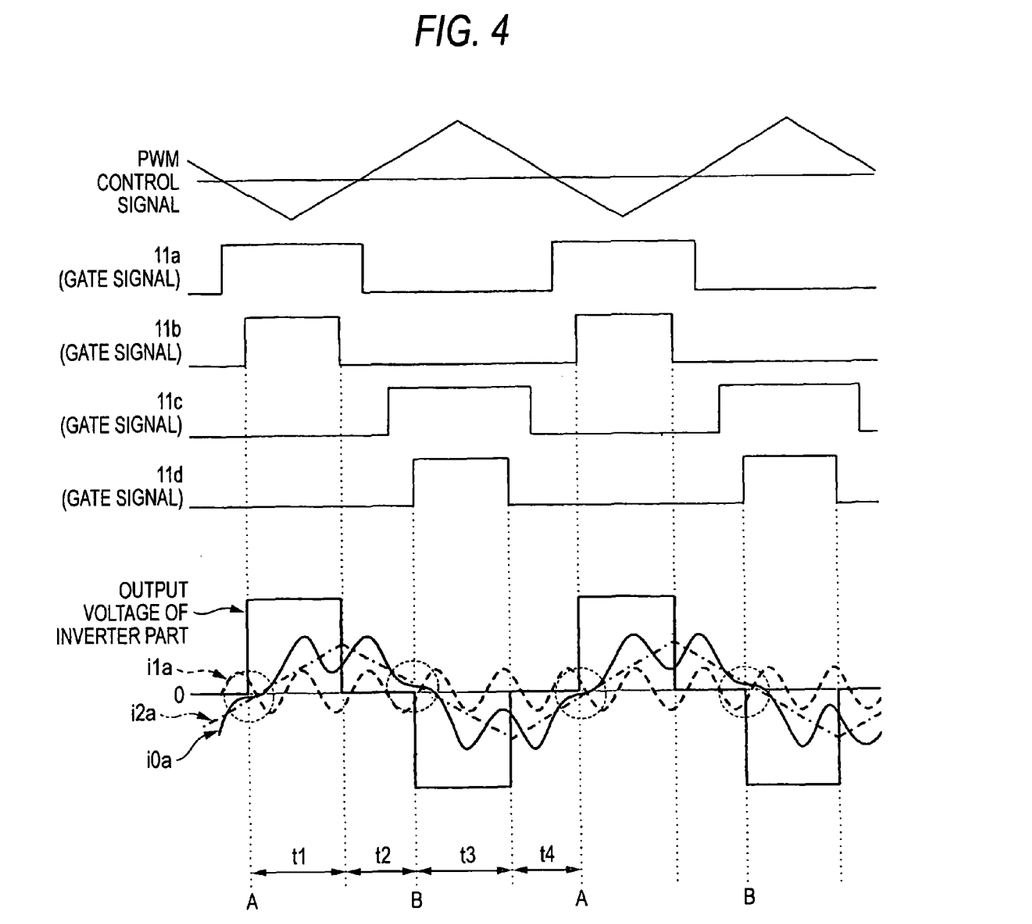
FIG. 4 shows waveforms of an output voltage and current during discharge off period of the load of the inverter part in the power device according to the first embodiment of the present invention.

FIG. 4 shows wave forms of an output voltage and current of the inverter part 3 during discharge off period in the power device according to this embodiment. The plus marks of the voltage wave forms and the current wave forms in FIG. 4 mean that the direction of the arrow mark of the output voltage in FIG. 8 is directed to a plus (a high potential) side and the output current flows in the direction the arrow mark. In FIG. 4, a broken line shows a current i1a supplied to the high frequency transformer 4 side. This wave form is equivalent to the wave form of the dark current of the usual power device without parallel inductance 7 shown in FIG. 10. A dashed line shows a current i2a supplied to the parallel inductance 7 side. Since the load is a simple inductive load, the output current has a phase lag relative to the output voltage as shown in FIG. 3. A full line shows the output current i0a of the inverter part 3 and i0a=i1a+i2a is established similarly to that during discharge on period.

In FIG. 4, at a point B when the switching element 11d is turned on, the current i1a supplied to the high frequency transformer 4 flows in the direction of the minus (from a switching element 11c to the high frequency transformer 4 and to the circulating current diode 12a). However, the current i2a supplied to the parallel inductance 7 side flows in the direction of the plus (from a switching element 11a to the parallel inductance 7 and to a circulating current diode 12c). When the absolute value of i2a is not lower than the absolute value of i1a, the output current i0a of the inverter part 3 as the total current of them flows in the direction of the plus (from the switching element 11a to the parallel inductance 7 and to the circulating current diode 12c) or the current does not flow. Thus, the recovery current is not generated in the circulating current diode 12a. When the absolute value of i2a is smaller than the absolute value of i1a, the output current i0a flows in the direction of the minus so that the recovery current is generated in the circulating current diode 12a. However, when a parallel reactor 7 is connected, the quantity of the current supplied in the direction of the minus can be decreased. Accordingly, the quantity of the recovery current supplied to the circulating current diode 12a can be effectively reduced more than that obtained when the parallel inductance 7 is not provided.

Similarly, at a point A when the switching element 11b is turned on, the current i1a supplied to the high frequency transformer 4 flows in the direction of the plus (from the switching element 11a to the high frequency transformer 4 and to the circulating current diode 12c). However, the current i2a supplied to the parallel inductance 7 side flows in the direction of the minus (from the switching element 11c to the parallel inductance 7 and to the circulating current diode 12a). When the absolute value of i2a is not lower than the absolute value of i1a, the output current i0a of the inverter part 3 as the total current of them flows in the direction of the minus (from the switching element 11c to the parallel inductance 7 and to the circulating current diode 12a) or the current does not flow. Thus, the recovery current is not generated in the circulating current diode 12c. When the absolute value of i2a is smaller than the absolute value of i1a, the output current i0a flows in the direction of the plus so that the recovery current is generated in the circulating current diode 12c. However, the quantity of the recovery current supplied to the circulating current diode 12c can be effectively reduced more than that obtained when the parallel inductance 7 is not provided, as in the point B when the switching element 11d is turned on. Here, as for i0a in FIG. 4, the current wave form is shown when the absolute values of i2a are larger than the absolute values of i1a at the points A and B.

In the configuration according to the first embodiment, since the recovery current is not generated in the circulating current diodes in the inverter 3 both during discharge on period and during discharge off period in the load, or the recovery current can be reduced, the heat of the circulating current diodes is hardly generated and the power device can be miniaturized and a cost can be lowered. Especially, at the points A and B in FIG. 4 where a backward voltage is applied to the circulating current diodes 12a and 12c, when the direction of the current i1a supplied to the high frequency transformer 4 is the same as the forward direction of the circulating current diodes 12a and 12c, the value of the parallel inductance 7 is set so that the absolute value of the current i2a supplied to the parallel inductance 7 is larger than the absolute value of the dark current i1a supplied to the high frequency transformer 4. Thus, the configuration in which the recovery current is not generated can be obtained.

The first embodiment is described above by using, as an example, the gas laser oscillator having the dielectric electrodes to generate the discharge between the dielectric electrodes as the load of the power device according to the present invention. However, the load is not especially limited to the gas laser oscillator and any load may be used that has an electrostatic capacity and forms a series resonance circuit together with the inductance L of the high frequency transformer 4.

Second Embodiment

Figure 5:
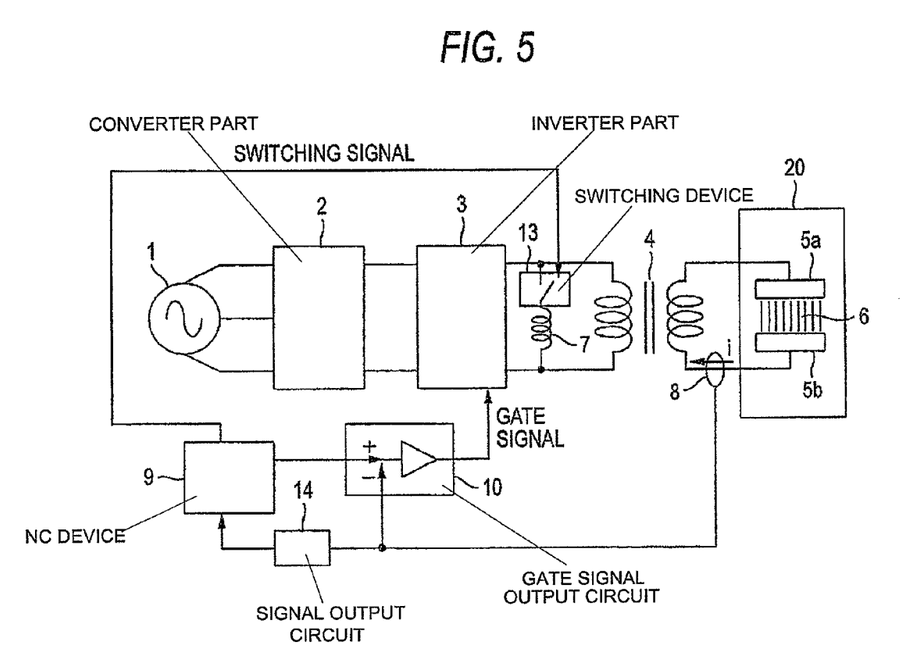
FIG. 5 is a basic block diagram of a power device according to a second embodiment of the present invention.

FIG. 5 shows one example of a block diagram for illustrating a second embodiment for carrying out the present invention. Since the basic configuration is the same as that of the first embodiment, the same parts are designated by the same reference numerals and an explanation thereof is omitted and different points from those of FIG. 1 will be described below.

In FIG. 5, in one end of a parallel inductance 7, a switching device 13 is provided that separates the parallel inductance 7 from a circuit during discharge on period and connects the parallel inductance 7 to the circuit during discharge off period by a switching signal outputted from an NC device 9 depending on whether or not the discharge 6 is generated. As for the presence or absence of the discharge 6, a discharge on signal output circuit 14 decides whether a current value detected by a discharge current detecting circuit 8 is large or small. The discharge on signal output circuit 14 outputs a signal for discriminating whether or not the discharge is generated to the NC device 9. In this case, the switching signal to be outputted to the switching device 13 does not necessarily need to be outputted from the NC device 9. The switching signal may be directly outputted from the discharge on signal output circuit 14 and the above-described method does not need to be restrictedly employed. Since an inverter part 3 shown in this embodiment has the same configuration as the circuit shown in FIG. 8, in this embodiment, an explanation will be given by using the reference numerals designated in FIG. 8.

Now, an operation of the second embodiment will be described below. Since a discharge current i1D supplied to a secondary side of a high frequency transformer 4 during discharge on period that is detected by the current detecting circuit 8 is larger than a dark current i1E supplied to the secondary side of the high frequency transformer during discharge off period (i1D>i1E), a current value "is" represented by i1D>"is">i1E is set and stored in a storing part of the discharge on signal output device 14.

A current ix detected by the current detecting circuit 8 is compared with the setting value "is" in a comparing part of the discharge on signal output device 14. When ix is larger than "is", that is, ix>"is", the discharge on signal output circuit 14 decides that the discharge is generated to transmit a signal to the NC device 9 from the output part of the discharge on signal output circuit 14 so as to separate the parallel inductance 7 from the circuit. The NC device 9 receiving a separating signal outputs a signal to the switching device 13 to disconnect the circuit. The switching device 13 disconnects the circuit to separate the parallel inductance 7 from the circuit. As a result, the configuration of the circuit connected to the output of the inverter part 3 is the same as the usual configuration (FIG. 7). Accordingly, all the output current of the inverter part 3 is supplied to the high frequency transformer 4, so that the wave forms of the output voltage and current shown in FIG. 9 are obtained.

When ix is smaller than "is", that is, ix<"is", the discharge on signal output device 14 decides that the discharge is not generated and transmits a signal to the NC device 9 from the output part of the discharge on signal output device 14 to connect the parallel inductance 7 to the circuit. The NC device 9 receiving a separating signal outputs a signal to the switching device 13 to connect the circuit. The switching device 13 connects the circuit so as to connect the parallel inductance 7 to the circuit. As a result, the configuration of the circuit connected to the output of the inverter part 3 is the same as that of the first embodiment (FIG. 1). Accordingly, the wave forms of the output voltage and current of the inverter part 3 show the wave forms shown in FIG. 4. Thus, a recovery current is not generated in a circulating current diode in the inverter part 3 or the recovery current can be reduced.

In the configuration according to the second embodiment, the same effects as those of the first embodiment can be obtained that since the recovery current is not generated in the circulating current diode in the inverter part 3 both during discharge on period and during discharge off period in the load, or the recovery current can be reduced, the heat of the circulating diode is hardly generated, a power device can be miniaturized and a cost can be lowered. Especially, it is to be understood that at the points A and B in FIG. 4 where a backward voltage is applied to the circulating current diodes 12a and 12c, when the direction of the current i1a supplied to the high frequency transformer 4 is the same as the forward direction of the circulating current diodes 12a and 12c, the value of the parallel inductance 7 is set so that the absolute value of the current i2a supplied to the parallel inductance 7 is larger than the absolute value of the dark current i1a supplied to the high frequency transformer 4, and accordingly, the configuration in which the recovery current is not generated can be obtained.

Further, in the first embodiment, during discharge on period, the output current of the inverter part 3 is increased more by the current supplied to the parallel inductance 7 than that in the related art and the load to the inverter part 3 is increased. However, in the second embodiment, since, during discharge on period, the parallel inductance 7 is separated from the circuit, the current supplied to the parallel inductance 7 is not required. Thus, the value of the output current of the inverter part 3 can be made to be equal to that of the related art. Consequently, the efficiency of the power device can be improved and the load of the switching elements 11a to 11d of the inverter part 3 can be reduced.

Third Embodiment

Figure 6:
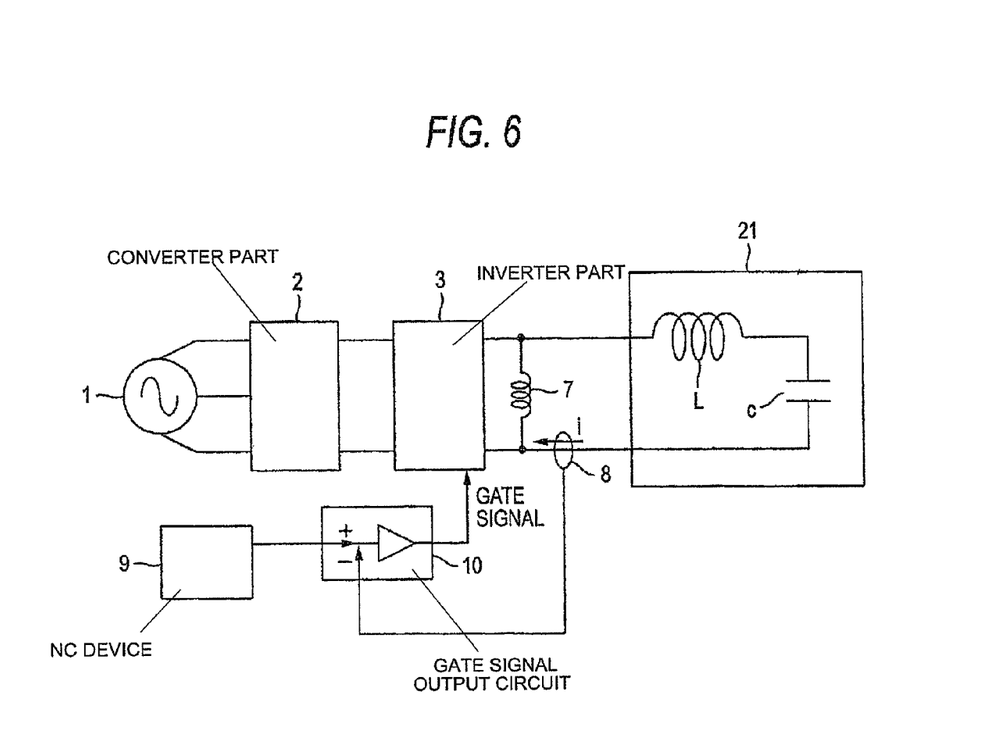
FIG. 6 is a basic block diagram of a power device according to a third embodiment of the present invention.

In the first embodiment and the second embodiment, the inductance of the high frequency transformer of the power device according to the present invention and the electrostatic capacity of the load form the series resonance circuit. However, as shown in FIG. 6, even when a load 21 has an inductance and forms an LC series resonance circuit in the load 21, and a power device does not include a high frequency transformer, a parallel inductance 7 is provided in parallel with the load 21 in the power device, so that an equivalent circuit in the load side of the inverter part of the power device is the same as that of FIG. 2 and the same effects as those of the first embodiment can be obtained. It is to be understood that the switching device 13 employed in the second embodiment is provided so that the same effects as those of the second embodiment can be obtained.

INDUSTRIAL APPLICABILITY

As described above, the power device according to the present invention is especially suitably used for supplying an electric power to the gas laser oscillator that has the dielectric electrodes to generate a discharge between the dielectric electrodes.

The invention claimed is:
1. A power device for supplying an electric power to a load in which an electrostatic capacity discontinuously changes, the power device comprising:
  a converter part for converting an AC voltage to a DC voltage;
  an inverter part that has a switching element and a circulating current diode connected in parallel with the switching element and converts the DC voltage outputted from the converter part to an AC voltage;

a transformer that has a first inductance forming a series resonance circuit with the electrostatic capacity of a load and converts the AC voltage outputted from the inverter part; and a second inductance connected to an output part of the inverter part, wherein the second inductance is connected in parallel with the transformer, wherein the second inductance is connected in parallel with the inverter part, and wherein the value of the second inductance is set so that when the switching element is turned on to apply a backward voltage to the circulating current diode, and a direction of a current supplied to the transformer is the same as a forward direction of the circulating current diode, then an absolute value of the current supplied to the second inductance is to be larger than an absolute value of the current supplied to the transformer.

2. The power device according to claim 1, further comprising:

a switching unit provided between one end of the second inductance and the output part of the inverter part to switch disconnection and connection of the second inductance to the output part of the inverter part; and a controller for controlling the switching unit.

3. The power device according to claim 2, wherein when a discharge is generated in a discharge part provided in the load, the controller controls the switching unit to disconnect the second inductance from the output part of the inverter part, and wherein when the discharge is not generated, the controller controls the switching unit to connect the second inductance to the output part of the inverter part.

4. The power device according to claim 3, further comprising a current detecting unit for detecting a value of the current supplied to the load, wherein the controller compares the value of the current detected by the current detecting unit with a setting value to decide whether or not the discharge is generated in the load.

5. The power device according to claim 1, wherein the second inductance is disposed between the inverter part and the transformer.

6. A power device for supplying an electric power to a load including an LC series resonance circuit, in which an electrostatic capacity discontinuously changes, the power device comprising:

a converter part for converting an AC voltage to a DC voltage;

an inverter part that has a switching element and a circulating current diode connected in parallel with the switching element and converts the DC voltage outputted from the converter part to the AC voltage; and an inductance connected to the output part of the inverter part, wherein the inductance is connected in parallel with the load, wherein the inductance is connected in parallel with the inverter part, and wherein the value of the inductance is set so that:

when the switching element is turned on to apply a backward voltage to the circulating current diode and a direction of a current supplied to the load is the same as a forward direction of the circulating current diode, an absolute value of the current supplied to the inductance is to be larger than an absolute value of the current supplied to the load.

7. The power device according to claim 6, further comprising:

a switching unit provided between one end of the inductance and the output part of the inverter part to switch disconnection and connection of the inductance to the output part of the inverter part; and a controller for controlling the switching unit.

8. The power device according to claim 7, wherein when a discharge is generated in a discharge part provided in the load, the controller controls the switching unit to disconnect the inductance from the output part of the inverter part, and wherein when the discharge is not generated, the controller controls the switching unit to connect the inductance to the output part of the inverter part.

9. The power device according to claim 8, further comprising a current detecting unit for detecting a value of the current supplied to the load, wherein the controller compares the value of the current detected by the current detecting unit with a setting value to decide whether or not the discharge is generated in the load.

10. The power device according to claim 6, wherein the inductance is disposed between the inverter part and the load.

11. A power device for supplying an electric power to a load including an LC series resonance circuit, in which an electrostatic capacity discontinuously changes, the power device comprising:

a converter part for converting an AC voltage to a DC voltage;

an inverter part that has a switching element and a circulating current diode connected in parallel with the switching element and converts the DC voltage outputted from the converter part to the AC voltage; and an inductance connected to the output part of the inverter part, wherein the inductance is connected in parallel with the load, wherein the inductance is connected in parallel with the inverter part, wherein the power device further comprises:

a switching unit provided between one end of the inductance and the output part of the inverter part to switch disconnection and connection of the inductance to the output part of the inverter part; and a controller for controlling the switching unit, wherein when a discharge is generated in a discharge part provided in the load, the controller controls the switching unit to disconnect the inductance from the output part of the inverter part, and wherein when the discharge is not generated, the controller controls the switching unit to connect the inductance to the output part of the inverter part.

12. The power device according to claim 11, further comprising a current detecting unit for detecting a value of the current supplied to the load, wherein the controller compares the value of the current detected by the current detecting unit with a setting value to decide whether or not the discharge is generated in the load.

* * * * *